UNITED STATES PATENT OFFICE.

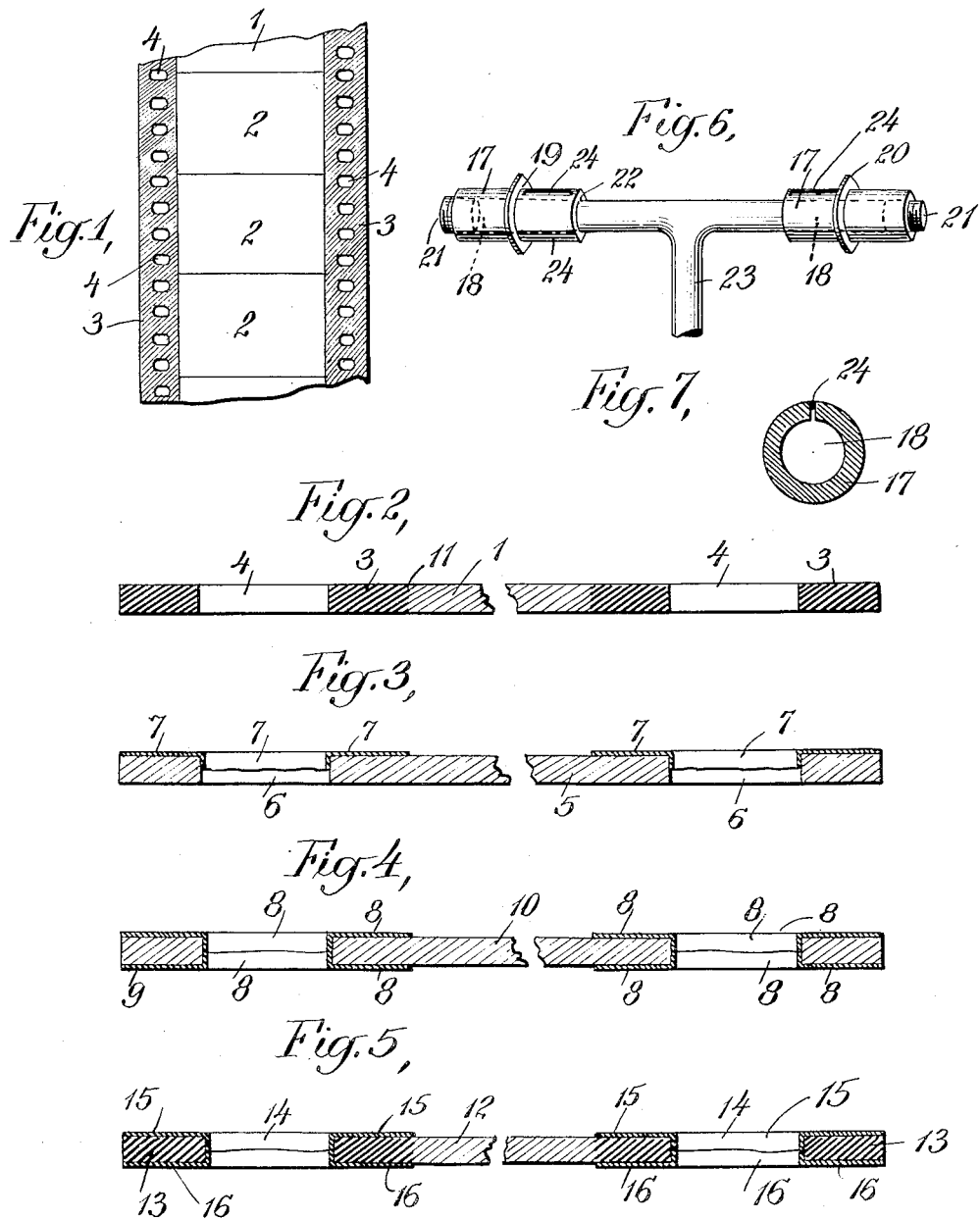

WILLIAM M. GROSVENOR, OF RIDGEWOOD, NEW JERSEY.

MOVING-PICTURE FILM.

1,226,655.  Specification of Letters Patent.  Patented May 22, 1917.

Application filed May 10, 1912. Serial No. 696,308.

*To all whom it may concern:*

Be it known that I, WILLIAM M. GROSVENOR, a citizen of the United States, and a resident of Ridgewood, county of Bergen, and State of New Jersey, have invented certain new and useful Improvements Relating to Moving-Picture Films, of which the following is a specification.

My invention relates to improvements in moving picture films and a means and method for treating the same. One object of my invention is to provide a new moving picture film and a means and method for producing the same whereby the life of the film is greatly increased and also whereby not only does the machine which operates the film cause less wear and tear on the film but also the film causes less wear and tear on the machine. My improvements are especially applicable to a positive film which is adapted to be used over and over again in well-known projecting machines.

Further objects, features and advantages will more clearly appear from the detailed description given below, taken in connection with the accompanying drawings which form a part of this specification.

Figure 1 is a front view of a section of film embodying my improvements in one form. Fig. 2 is a section of the same greatly enlarged and somewhat out of proportion in order to more clearly illustrate the invention. Fig. 3 is a similar section of a film embodying my improvements in a modified form. Fig. 4 is a section showing a still further modification and Fig. 5 is a similar section showing another modification. Fig. 6 is a perspective illustrating a device by which one form of my improvements may be carried out and Fig. 7 is a section of the same.

In the projection of moving pictures as now generally carried out positive photographic pictures are produced upon a film or strip of celluloid or cellulose acetate or similar material, which film or strip is perforated along its center or at its edges and is intermittently moved by means of sprocket wheels or similar devices engaging the perforations. It is found that such films on passing through the apparatus are subject to great wear and tear by the sprocket teeth or other engaging devices so that the films soon become unfit for further use. It is also well-known that the wear and tear is not altogether in the celluloid film but that the sprocket teeth or other engaging devices, even though made of hard steel, are subject to great wear and accordingly have to be renewed from time to time. Consequently the life of such moving picture films or strips is limited and it is extremely desirous to overcome these defects and increase the life of the film by decreasing the wear and tear thereon, if possible.

I have discovered that one of the chief causes of breakage is the sticky cutting character of the material of which the film is composed, causing excessive friction and wear and making it catch and tear easily when in rapid motion. To overcome this I have found that automatic lubrication of the film such as by a constituent of its composition is most effective.

One feature of the invention consists in providing either superficially on or throughout the thickness of the engaging portion of the film a suitable lubricant preferably solid or semi-solid. Another feature consists in providing suitable lubricants that will incorporate themselves with the film substance without excessively reducing its strength, hardness or elasticity, without flying or creeping over the photographic surface, and without wiping off the film but which when the film begins to wear will spread over the worn surfaces of the perforations. Other features consist in improved methods of lubricating either superficially or throughout the thickness of all or a portion of the film at or near the running edge of the marginal or central perforations without interfering with the picture area, the method of applying or distributing the lubricant to the contact surface where it will tend to preserve rather than aid in destroying the perforated structure by taking the incipient wear of the film itself.

Referring to Figs. 1 and 2,—1 represents a suitable moving picture film which may be provided with the positive pictures at 2, 2, 2. The center portion of the film is preferably made of celluloid material and, of course, may carry the photographic emulsion or coating embodying the pictures desired. At the edges 3, however, the celluloid film has incorporated in the body thereof graphite. The film at the edges may be perforated in the well-known manner with perforations 4. The film shown in Figs. 1 and 2 may be made as follows:

In the modified form shown in Fig. 3 the ordinary undeveloped, developed, negative or positive film strip 5 is treated by applying to the edges and about the perforations 6 a coating 7, which coating in the best form consists of a mixture of celluloid, graphite and a mixture of amyl acetate and wood alcohol, which forms a solvent of celluloid. As will be seen from Fig. 3, the mixture flows into the perforations 6 to a considerable extent, as well as forming a coating over the entire edges of the films.

When such a moving picture film or strip is run through a projecting machine or similar apparatus, the teeth entering the apertures 6 are lubricated by means of the graphite contained in the coating. The pressure of the sprockets against the film causes a certain amount of the lubricant to be forced into the body of the film so that as the film wears away it is still available for lubrication. This lubrication prevents to a very great extent the wearing of the apertures by the teeth and also the wearing of the teeth by the edges of the perforations so that such a film may be run through an apparatus a good many more times and under very bad conditions before any material wearing or tearing of the film at the perforations is noticed. Thus the life of the film is greatly increased and manufacturers are not so liable to have film returned to them as poor or unsatisfactory. Furthermore the applying of such a lubricant at the edges of the film not only decreases the wear and tear on the film itself as well as on the teeth or equivalent devices which move the film but also lubricates all parts of the apparatus which come in contact with the edges of the film so that these parts are correspondingly lubricated, thereby decreasing the wear thereof as well as decreasing any damage which they might do to the film itself.

As shown in Fig. 4, the coatings 8 and 9 are applied to both sides of the edges of the film 10. This may be specially advantageous in connection with some particular kinds of apparatus where operating parts engage to a considerable extent both sides of the film. If, however, operating parts which cause the most of the wear and tear contact with only one side of the film, then the structure shown in Fig. 3 may be amply sufficient.

The structure shown in Fig. 2 operates in the same manner as that shown in Figs. 3 and 4. The graphite being incorporated with the celluloid of the film itself or being incorporated in a mixture which is applied to the edge of the picture portion of the film, as at 11, then, as any wear takes place, the graphite incorporated in the body of the edge acts as a lubricant to all parts entering in contact therewith so as to prevent or decrease any further wear and tear on the film.

The modification shown in Fig. 5 is a combination of the structure shown in Fig. 2 with the coatings of Fig. 4 applied to both sides of the edges of the film. Thus the film strip 12 has at its edges 13 adjacent perforations 14 and graphite coatings 15 and 16 applied thereto and also has graphite incorporated in the edge portions 13 so that a most thorough lubrication is obtained.

It will be observed that in all cases the lubricant is applied at or at least near to the surface of the film and in some cases reserve lubricant is to be found even deep within the film. Numerous lubricants may be used with more or less satisfaction as for instance rice starch which is extremely fine in its state of division, talcum powder, asbestos fiber of a schistose nature, flake graphite or deflocculated graphite. Also metallic reinforcing threads or wires as well as finely pulverized friction alloys or similar materials suitably attached to the surface or incorporated in the body of the film, but I prefer to use finely pulverized graphite. Liquid or paste lubricants have also been tried with some success but tend by their surface tension and splashing qualities when entirely liquid to creep into the picture area and obscure the projection. A loose dry lubricant tends to fly about and become similarly misplaced and only attaches itself lightly to the various parts of the film until at some point of mechanical contact when the plastic character of the film tends to make it adhere at the point where it is needed. The dry unctuous lubricants are preferred because they do not melt or soften by the action of the heat which accompanies the illumination, they do not spread under the rolling action of the guide wheels or gather dust and clog the sprocket wheels. Unctuous solids are most preferred because they immediately adhere when mechanically pressed at the friction points and become embedded or incorporated in the film and spread about only so far as the friction distributes them.

I have found that such unctuous solids do not lose their lubricating power when incorporated with certain proportions of the material which constitutes the film. An excess of lubricant may be used, the lubricant becoming so thoroughly distributed and embraced within the film material that the film is very slightly affected. If too much lubricant is used the tenacity and resistant qualities of the film are likely to be injured. In applying graphite to the surface of the film I prefer to use a mixture made as follows:

| | |
|---|---|
| Finely pulverized graphite | 20 grams. |
| Celluloid shavings or clear scraps | 10 " |
| Methyl alcohol | 160 " |
| Amyl acetate | 50 " |

The celluloid is completely dissolved, the graphite added and the whole thoroughly mixed before using, and a thin coating applied in a dry atmosphere.

This produces a creamy black liquid which can be readily applied to the surface of the film, which adheres firmly in thin layers and contains sufficient lubricant to burnish instead of cutting away when rubbed by metallic surfaces that are reasonably smooth. The liquid may be applied by a brush, by a wheel dipped into the liquid or revolving against a surface suitably moistened with the liquid, but for a side perforated film I prefer to apply it by drawing the film around a small tube supplied internally with the liquid at a gentle positive pressure and having small perforations at the points where the liquid is to be supplied as shown in Figs. 6 and 7. Referring to Fig. 6, the apparatus consists mainly of a tube 17 having a bore or hole 18 therethrough with an annulus at 19 and an annulus at 20 acting as guides for the film as it is drawn over the device. The tube 17 is preferably plugged at both ends by means of plugs 21 and is reduced in diameter at 22 as clearly shown in drawings. Connecting with the tube at the reduced portion 22 is a pipe connection 23 through which the fluid coating to be applied is introduced under certain hydraulic head. Between each annulus 19 and 20 and the reduced portion 22 slots 24 are cut from the periphery of the tube down to the central bore 18. These slots are preferably rectangular in shape and do not quite extend to the cut-away portion at 22. The film to be treated is drawn over the device shown in Fig. 6 and Fig. 7, the device being held stationary. The film may be drawn over the device at a speed of about half of that speed which is used when the film is put through a projecting apparatus in the usual way. When the film 25 is drawn over the device, the annulus 19 and the annulus 20 properly guiding the same, the coating mixture is gradually forced through the pipe 23 into the bore 18, thence upwardly through the slots 24 where it is deposited upon the edges of the film as will be readily understood by those skilled in the art. For lubricating perforations in the center of the film I may apply the lubricant by the cogs of wheels similar to the film drivers of the moving picture machines.

In applying the lubricant throughout the thickness of the wearing edge I prefer to use a film perforated along the sides and to make the film in either of several ways, as follows:

1. *Table method.*—Where films are manufactured by flowing a thin layer of the plastic over a large table and cutting the resulting sheet into film, I prefer to cut away broad strips corresponding to twice the width of the perforation margin between each pair of the films and to flow between the remaining clear films the lubricating mixture if necessary first brushing over the edge of the remaining clear film with suitable solvent to promote the thorough union of the clear and lubricated portions. I can then in finally cutting up the sheet to form film cut down through the center of the lubricated band leaving a complete film with two lubricated edges between these cuts.

2. *Table method for center perforated films.*—In this case no continuous band is desirable and it is preferable to have only a circulated or elongated spot of lubricated material at the point where the film is to be perforated. This result I may secure by perforating the table at suitable intervals and either ejecting from these perforations a small quantity of the lubricated material after the clear film has been flowed but before it has hardened or else sucking through these perforations a small portion of the film in a similar manner just before it has hardened and replacing it from above with corresponding quantities of the lubricated mixture.

3. Or I may place upon suitable centering pins projecting from the surface of the table small perforated disks of the lubricated material, moisten their edges with a suitable solvent and flow the clear liquid around them.

4. *Shaving method.*—A disk of the lubricated material about 16″ or more in diameter having a thickness equal to the width of a single perforation edge, may be cemented to a clear disk of similar diameter having a thickness equal to the width of the photographic area and this in turn cemented to a lubricated disk having a thickness about equal to twice the width of the perforation margin, followed alternately by similar clear disks and lubricated disks ending (after the last clear disk) with a lubricated disk having the thickness of the perforation margin. The resulting cylinder may then be axially mounted and a sheet of films joined at their edges simultaneously shaved tangentially from its circumference as is done in the cutting of veneers from timber.

5. Table strips of lubricated material may be laid at suitable distances apart down the length of the table, their edges moistened if desired and the clear material flowed between to form a continuous sheet or to form a single film if desired according to the way in which the lubricated strips are cut and arranged.

It will be obvious also that to a less satisfactory extent I may secure similar results by rolling or driving the lubricating material into the surface of a film after it is completed. In all these cases, however, a common method of making the new film has been used, *i. e.*, the lubricant has been mechanically incorporated with the surface of the film itself in such manner and proportion that the wear of the film will continue to supply a modicum of lubricated material to the actual frictional surfaces as the process of wear proceeds.

It will thus be seen that by my improvements the film is so treated or has matter applied thereto at its edges or about the perforations whereby lubrication is obtained, which not only prevents wear and tear of the film to a great extent and increases the life of the film but also increases the life of parts of apparatus which operate the film and also causes a more smooth running of the apparatus. It will, therefore, be seen that I need only apply the coating at the edges or the portions of great wear and tear and the application of my improvements, either as coating or in the body of the celluloid, in no way affects the pictures to be produced. While an ordinary film may be said to be about 6/1000 of an inch thick, the coating which I apply after it has dried need be only between 1/1000 and 2/1000 of an inch thick so that the additional thickness at the edges is practically immaterial and need not prevent the film from lying flat, either in the machine or when reeled.

Although I have described my improvements in great detail and with respect to certain particular embodiments thereof, nevertheless I do not desire to be limited to such details, except as clearly specified in the appended claims, since many changes and modifications may well be made without departing from the spirit and scope of my improvements in their broader aspects.

Having fully and clearly described my invention, what I claim as new, what I desire to secure by Letters Patent is:

1. A film or strip of the class described having lubricating matter embodied in the body thereof at the portions of great wear and tear, whereby the life of the film is increased.

2. A moving picture film or strip having graphite incorporated in the body of the film at the portions of great wear and tear.

3. A perforated moving picture film having graphite incorporated in the body of the film at and about the perforations for the purpose of lubrication.

4. A moving picture film or strip, having perforations along its edges, and graphite incorporated in the body of the film at and about the perforations and having a graphite coating along its edges at and about the perforations on both sides of the film.

5. A moving picture film or strip, having graphite incorporated in the body of the film at the portions of greatest wear and having a graphite coating along said portions to increase the life of the film.

6. A film or strip of the class described having applied thereto a mixture of graphite, a solvent of the material of which the film is made and celluloid substantially as and for the purposes described.

7. A film or strip of the class described having applied thereto a mixture of graphite, and a solvent of the material of which the film is made, substantially as and for the purposes described.

8. The improved method of improving moving picture film which consists in preparing a mixture of celluloid, graphite and a solvent of the film and coating portions of the film subjected to wear and tear with the mixture, whereby the solvent softens the celluloid of the film and causes the film to be united firmly with the mixture when dry.

9. The improved method of making moving picture film which consists in preparing a mixture of material from which the film is made, a lubricant and a solvent of the material from which the film is made, and then applying the mixture to the edges of the film.

10. The improved method of making celluloid or the like moving picture film which consists in preparing a mixture of celluloid, graphite and a solvent of the material from which the film is made, and then applying the mixture to the edges of the film.

11. The improved method of treating moving picture film which consists in applying thereto a coating of a mixture of graphite and a solvent of the material from which the film is made.

12. The improved method of making moving picture film or strips, which consists in preparing a mixture embracing a lubricant and a solvent of the material from which the film is made and applying the mixture to the edges of the strip.

13. The improved method of treating moving picture film or strips which consists in applying to parts thereof subject to wear and tear, a mixture of a lubricant and a solvent of the material from which the film or strip is made.

14. A film of the class described, having a lubricant commingled with portions of the material which constitute the mechanical transmitting portion of the film.

15. A moving picture film having lubricating matter embedded in the body of the film at the wearing portions thereof.

In testimony whereof, I have signed my name to this specification, in the presence of two subscribing witnesses.

WILLIAM M. GROSVENOR.

Witnesses:
GORHAM CROSBY,
EDWIN SEGER.